US010423843B2

United States Patent
Biemer et al.

(10) Patent No.: US 10,423,843 B2
(45) Date of Patent: Sep. 24, 2019

(54) VEHICLE VISION SYSTEM WITH ENHANCED TRAFFIC SIGN RECOGNITION

(71) Applicant: MAGNA ELECTRONICS INC., Auburn Hills, MI (US)

(72) Inventors: Michael Biemer, Aschaffenburg-Obernau (DE); Ruediger Boegel, Großostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 27 days.

(21) Appl. No.: 15/903,138

(22) Filed: Feb. 23, 2018

(65) Prior Publication Data

US 2018/0239972 A1 Aug. 23, 2018

Related U.S. Application Data

(60) Provisional application No. 62/462,532, filed on Feb. 23, 2017.

(51) Int. Cl.
| | |
|---|---|
| *G06K 9/00* | (2006.01) |
| *G06K 9/32* | (2006.01) |
| *B60W 50/14* | (2012.01) |
| *G06K 9/42* | (2006.01) |

(52) U.S. Cl.
CPC ......... *G06K 9/00818* (2013.01); *B60W 50/14* (2013.01); *G06K 9/3241* (2013.01); *G06K 9/3258* (2013.01); *G06K 9/42* (2013.01); *B60W 2420/42* (2013.01)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 9,187,028 B2 | 11/2015 | Higgins-Luthman |
| 9,280,560 B1 * | 3/2016 | Dube ................. G06K 9/00523 |
| 9,428,192 B2 | 8/2016 | Schofield et al. |
| 2003/0108252 A1 * | 6/2003 | Carrig ................... G06T 3/4053 382/299 |

(Continued)

OTHER PUBLICATIONS

Aharon et al., "K-SVD: An Algorithm for Designing Overcomplete Dictionaries for Sparse Representation," IEEE Transactions on Signal Processing, vol. 54, No. 11, Nov. 2006.

(Continued)

*Primary Examiner* — Stephen P Coleman
(74) *Attorney, Agent, or Firm* — Honigman LLP

(57) ABSTRACT

A vision system for a vehicle includes a camera disposed at the vehicle and having a field of view exterior of the vehicle. The camera captures image data. A control includes an image processor operable to process image data captured by the camera. The control, responsive at least in part to putative detection of a traffic sign via image processing by the image processor of image data captured by the camera, enhances resolution of captured image data based at least in part on known traffic sign images to generate upscaled image data. The control compares captured image data to upscaled image data to determine and/or classify and/or identify the putatively detected traffic sign.

20 Claims, 9 Drawing Sheets

(56) References Cited

U.S. PATENT DOCUMENTS

| | | |
|---|---|---|
| 2009/0144311 A1* | 6/2009 | Stratis .................... G06F 16/58 |
| 2014/0327772 A1 | 11/2014 | Sahba |
| 2016/0034769 A1 | 2/2016 | Singh |
| 2016/0210853 A1 | 7/2016 | Koravadi |
| 2018/0225530 A1 | 8/2018 | Kunze et al. |

OTHER PUBLICATIONS

He et al., "Deep Residual Learning for Image Recognition", Computer Vision Foundation, pp. 770-778.

Ledig, "Photo-Realistic Single Image Super-Resolution Using a Generative Adversarial Network," arXiv:1609.04802v3 [cs.CV] Nov. 21, 2016, pp. 1-19.

Van den Oord et al., "Pixel Recurrent Neural Networks," aparXiv: 1601.06759v3 [cs.CV] Aug. 19, 2016, pp. 1-11.

Yu, "Ultra-Resolving Face Images by Discriminative Generative Networks," Australian National University, European Conference on Computer Vision, 2016.

* cited by examiner

VEHICLE VISION SYSTEM WITH ENHANCED TRAFFIC SIGN RECOGNITION

CROSS REFERENCE TO RELATED APPLICATION

The present application claims the filing benefits of U.S. provisional application Ser. No. 62/462,532, filed Feb. 23, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides enhanced traffic sign recognition via training of the system based on a stock of images of traffic signs and known values for traffic signs. The system determines or recognizes or classifies a putatively detected traffic sign present in the field of view of the camera based on the training and based on the low resolution image data captured by the camera and upscaling of the image data.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and to process the image data to detect an object, and that may detect and identify or classify an object, such as a traffic sign or the like. Optionally, the vision system may provide an output to a display device for displaying images representative of the captured image data. Optionally, the vision system may provide display, such as a rearview display or a top down or bird's eye or surround view display or the like.

Figure 1:
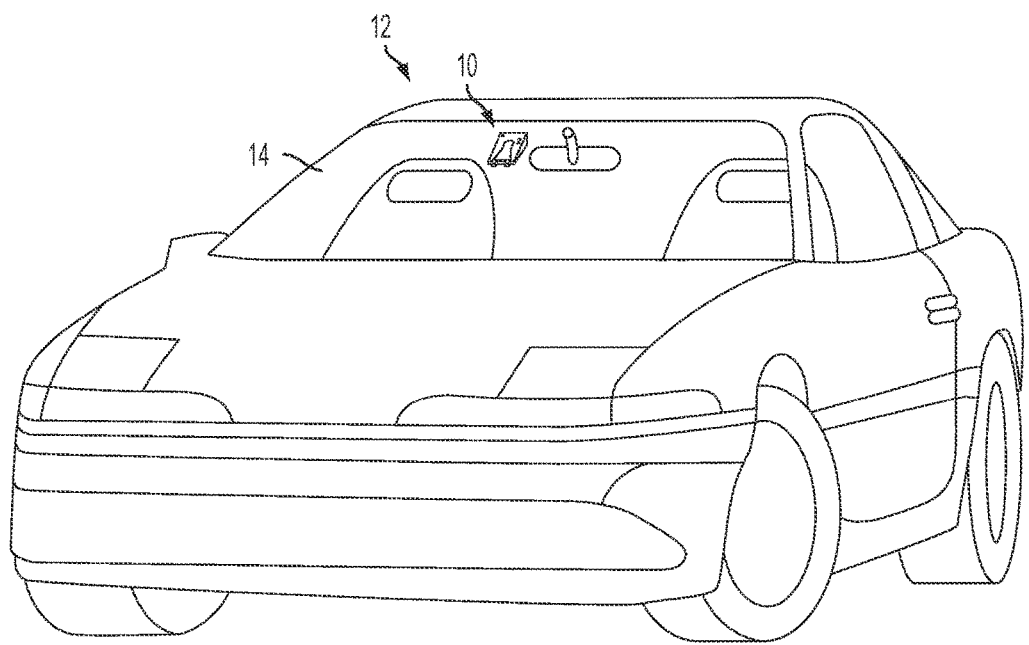
FIG. 1 is a plan view of a vehicle with a vision system that incorporates cameras in accordance with the present invention.

Referring now to the drawings and the illustrative embodiments depicted therein, vision system 10 for a vehicle 12 includes at least one exterior viewing imaging sensor or camera, such as a forward viewing imaging sensor or camera, which may be disposed at and behind the windshield 14 of the vehicle and viewing forward through the windshield so as to capture image data representative of the scene occurring forward of the vehicle (FIG. 1). Optionally, the system may include multiple exterior viewing imaging sensors or cameras, such as a forward viewing camera at the front of the vehicle, and a sideward/rearward viewing camera at respective sides of the vehicle, and a rearward viewing camera at the rear of the vehicle, which capture images exterior of the vehicle. The camera or cameras each include a lens for focusing images at or onto an imaging array or imaging plane or imager of the camera. Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 10 includes a control or electronic control unit (ECU) or processor that is operable to process image data captured by the camera or cameras and may detect objects or the like and/or provide displayed images at a display device for viewing by the driver of the vehicle. The data transfer or signal communication from the camera to the ECU may comprise any suitable data or communication link, such as a vehicle network bus or the like of the equipped vehicle.

In automotive vision and non-vision sensor perception, resolution matters when it comes to the task to detect specific objects at far distances away from the equipped vehicle. This is especially severe since, for example, automotive vision sensors typically lack the high resolution characteristics that may be found in industry and consumer electronics. For example, a typical automotive camera may have, for example, 2 Mega Pixels or more, while a common DSLR (digital single-lens reflex) camera typically has 16 Mega Pixels or more paired with a comparable or better noise level.

To cope with the low resolution of automotive cameras, upscaling would be welcome, but in accordance with the Nyquist-Shannon sampling theorem, low resolution images do not contain the data to do so (underspecified). Due to real time scene changes and heavy motion flow when driving, upsampling by superposition (superposing multiple consecutive images with sub pixel positional differences to one resulting high resolution image) is not well suitable for use in automotive vision or sensor upscaling.

Figure 2:
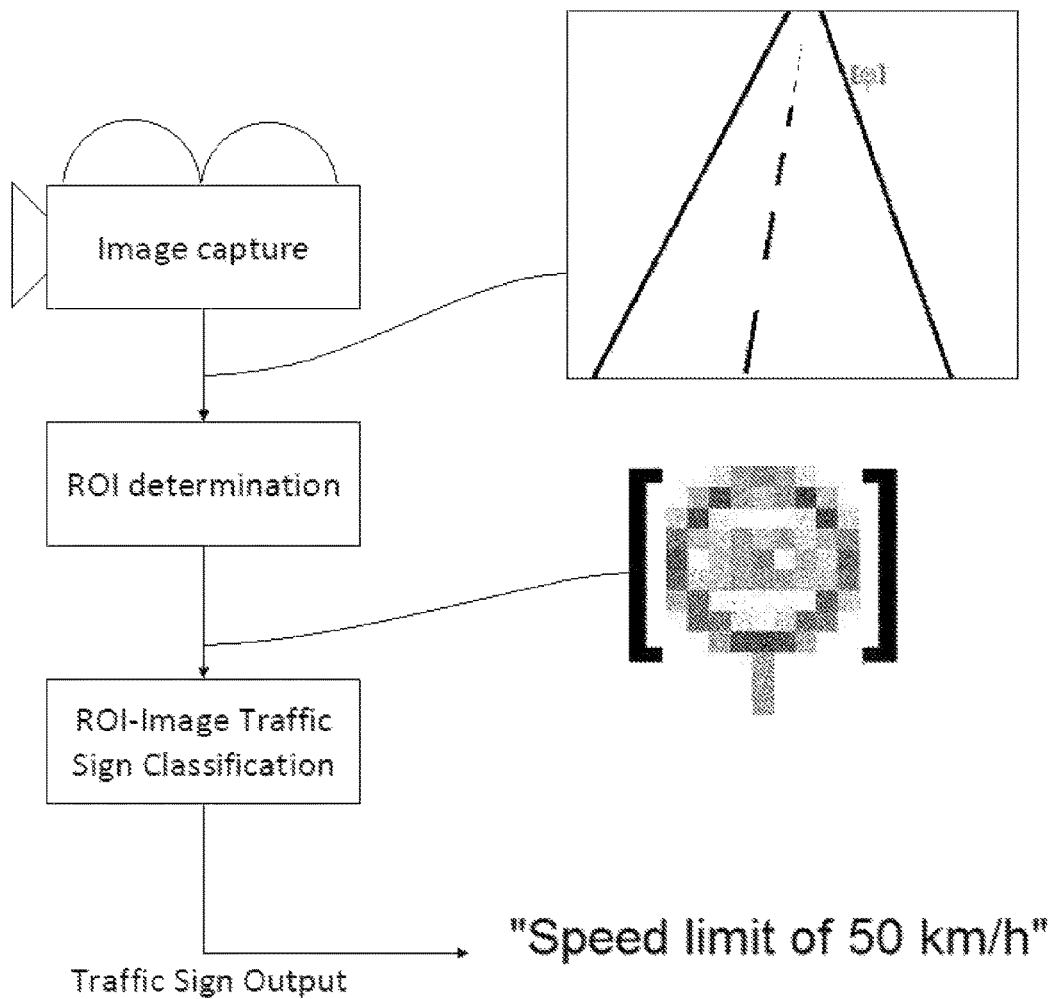
FIG. 2 shows an ROI-image traffic sign classification process.
Figure 3:
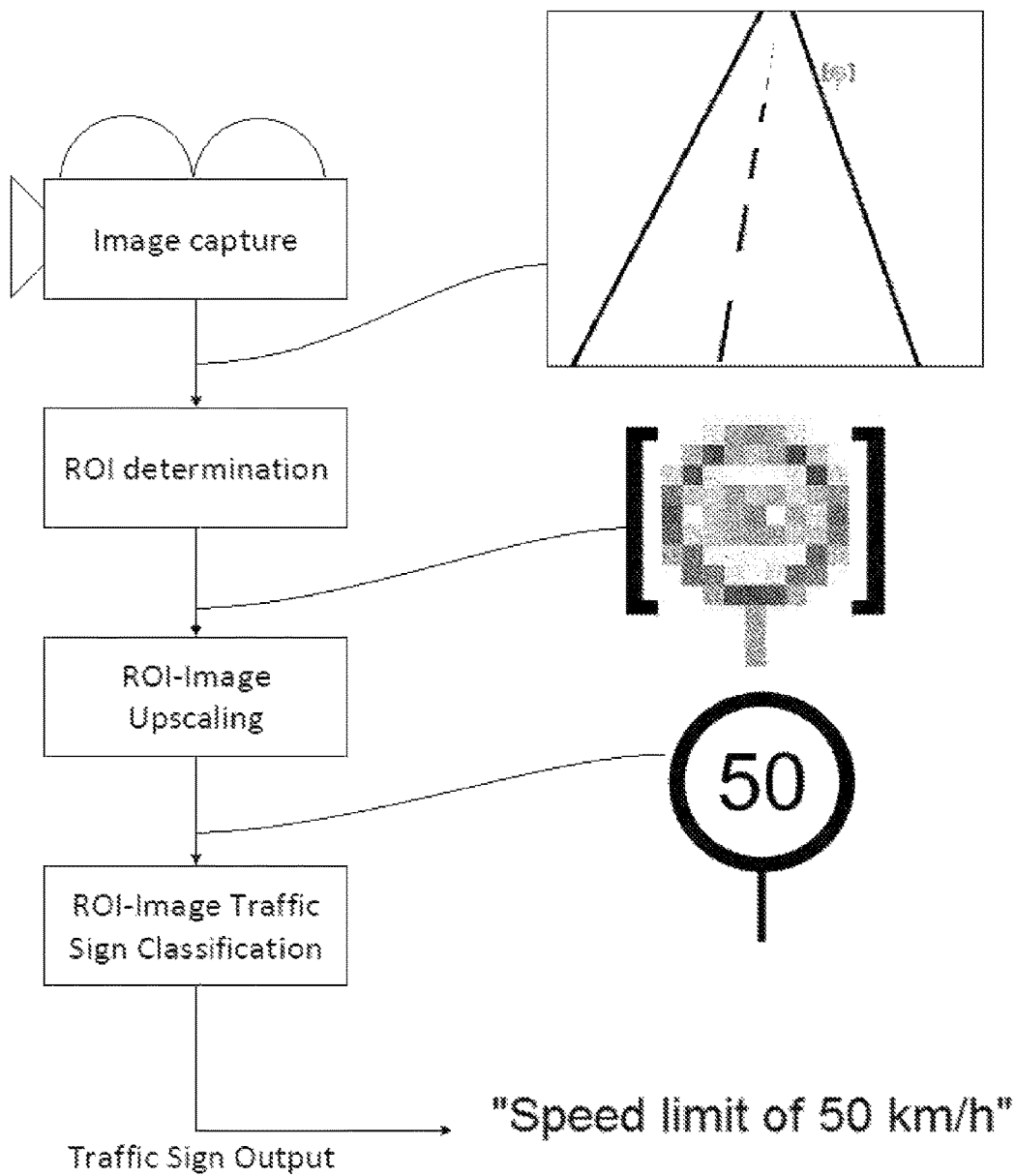
FIG. 3 shows an ROI-image traffic sign classification process that uses ROI-image upscaling in accordance with the present invention.

For improving traffic sign recognition TSR algorithms, which detect a traffic sign (TS) within a region of interest ROI directly (see FIG. 2), the algorithm of the present invention may have an image enhancement or upscale stage comprising a probabilistic super resolution model that allows it to enhance the image by the knowledge of the relation of low resolution input images such as taken from an automotive forward vision camera and high resolution image content which has been trained as a reference in a prior training phase (see FIG. 3). The ROI may be given by any kind of known art shape or scene recognition image processing algorithm. Since the output of possible traffic signs is limited to a discrete number, especially when taking regional contexts into account, the model may be learned with correspondences for the most likely content interpolations for the specific traffic signs.

Figure 4:
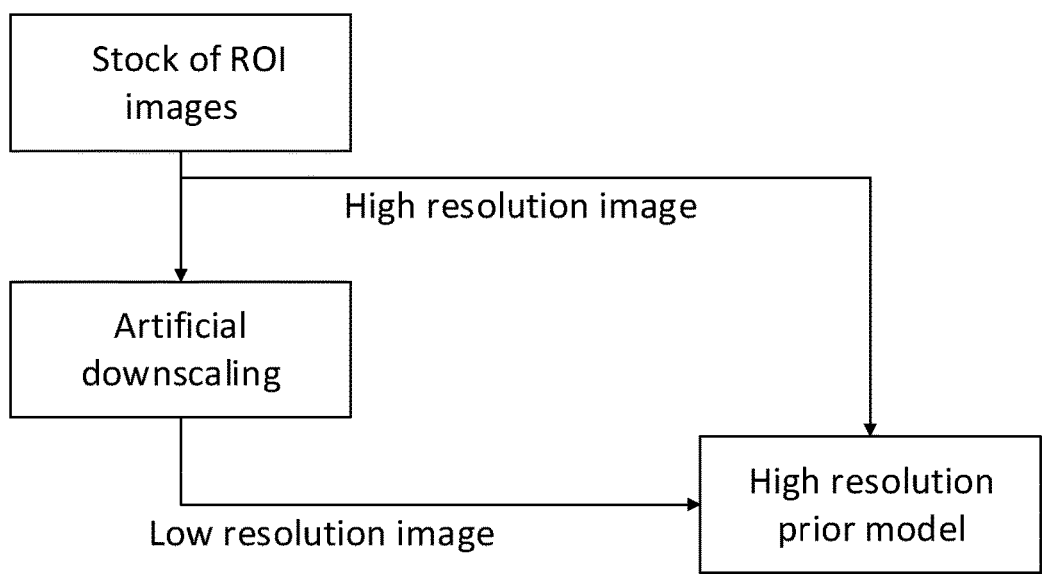
FIG. 4 is a process diagram showing the process of determining high resolution models.
Figure 5:
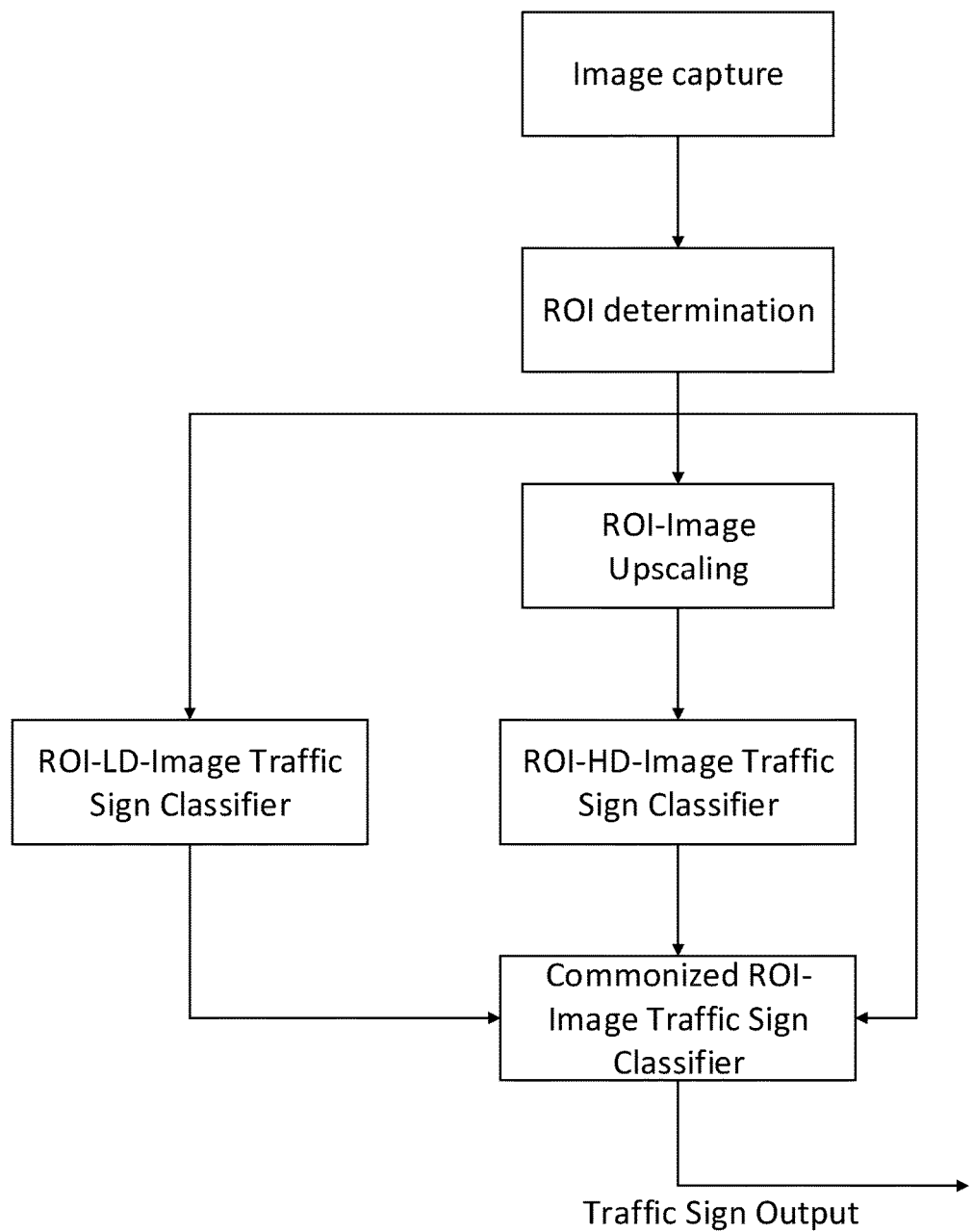
FIG. 5 is a process diagram showing traffic sign recognition using a commonized ROI-image traffic sign classifier in accordance with the present invention.

The "ROI image upscaling" may be done based on a prior model. The training may be done by comparing the low resolution image to a high resolution model image (from a stock of ROI images), such as shown in FIG. 4. Since the traffic sign classifier may also benefit from the knowledge of the originally captured ROI image (without possible artifacts from the upscaling), it may receive both the original image and the upscaled image, such as shown in a more advanced, optional algorithm in FIG. 5. As shown in FIG. 5, the commonized ROI image traffic sign classifier receives the captured image data (low resolution) and an output of an ROI-LD-image traffic sign classifier (that classifies the detected traffic sign based on the low resolution captured image data) and an output of an ROI-HD-image traffic sign classifier (that classifies the detected traffic sign based on the ROI-image upscaling), and processes the inputs to classify or recognize the detected traffic sign.

Figure 6:
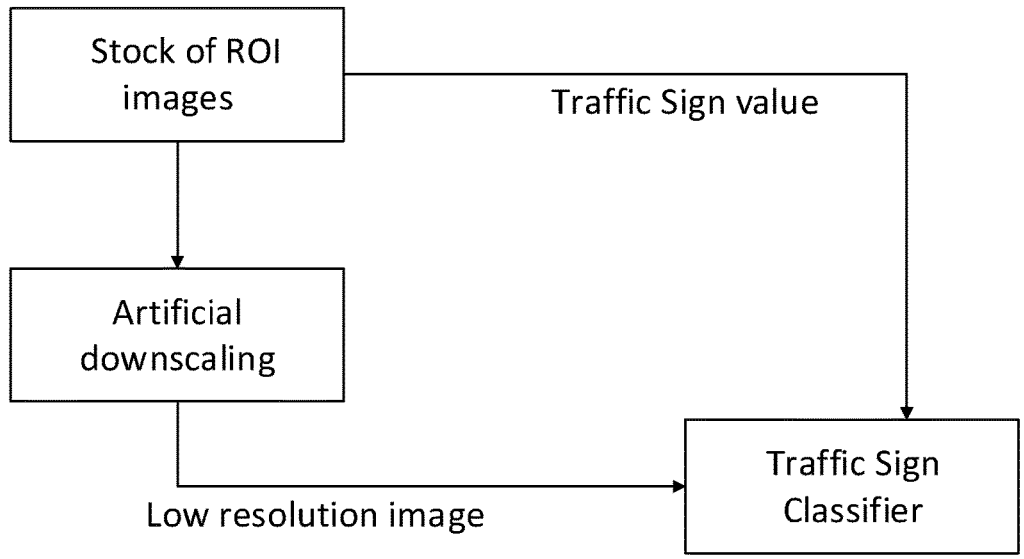
FIG. 6 is a process diagram showing operation of a traffic sign classifier trained using stock images and artificial downscaling in accordance with the present invention.
Figure 7:
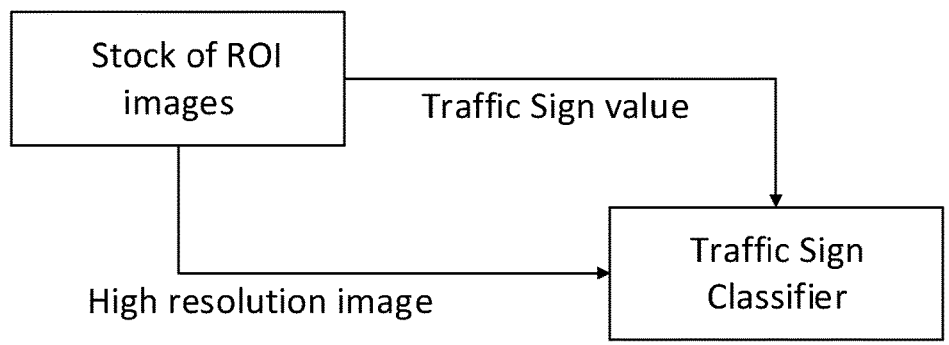
FIG. 7 is a process diagram showing operation of a traffic sign classifier trained using stock images.
Figure 8:
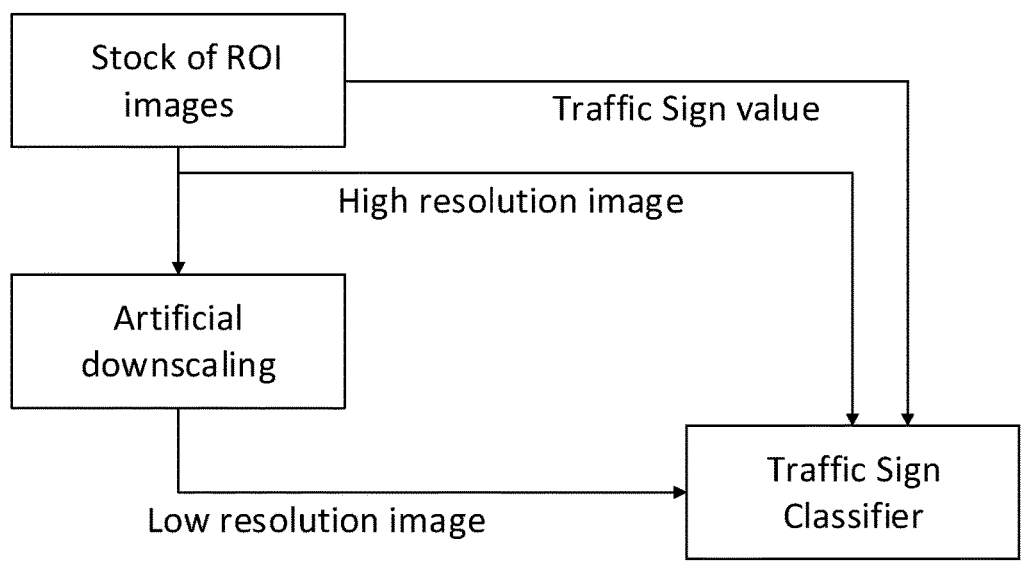
FIG. 8 is a process diagram showing operation of a traffic sign classifier trained using stock images and artificial downscaling in accordance with the present invention.

Additionally, there is a traditional classifier that does traffic sign classification on the original ROI image which result is fed into a commonized classifier that comes to the final traffic sign output value. The training may be done with according inputs, and the traditional classifier may be trained with low resolution images plus their meaning or value (see FIG. 6). The training of the classifier receiving the upscaled or high resolution image may be done by feeding high resolution images plus their meaning or value into the classifier (see FIG. 7). During training, the commonized classifier may receive the low resolution image, the high resolution image and the final traffic sign value, such as shown in FIG. 8.

Figure 9:
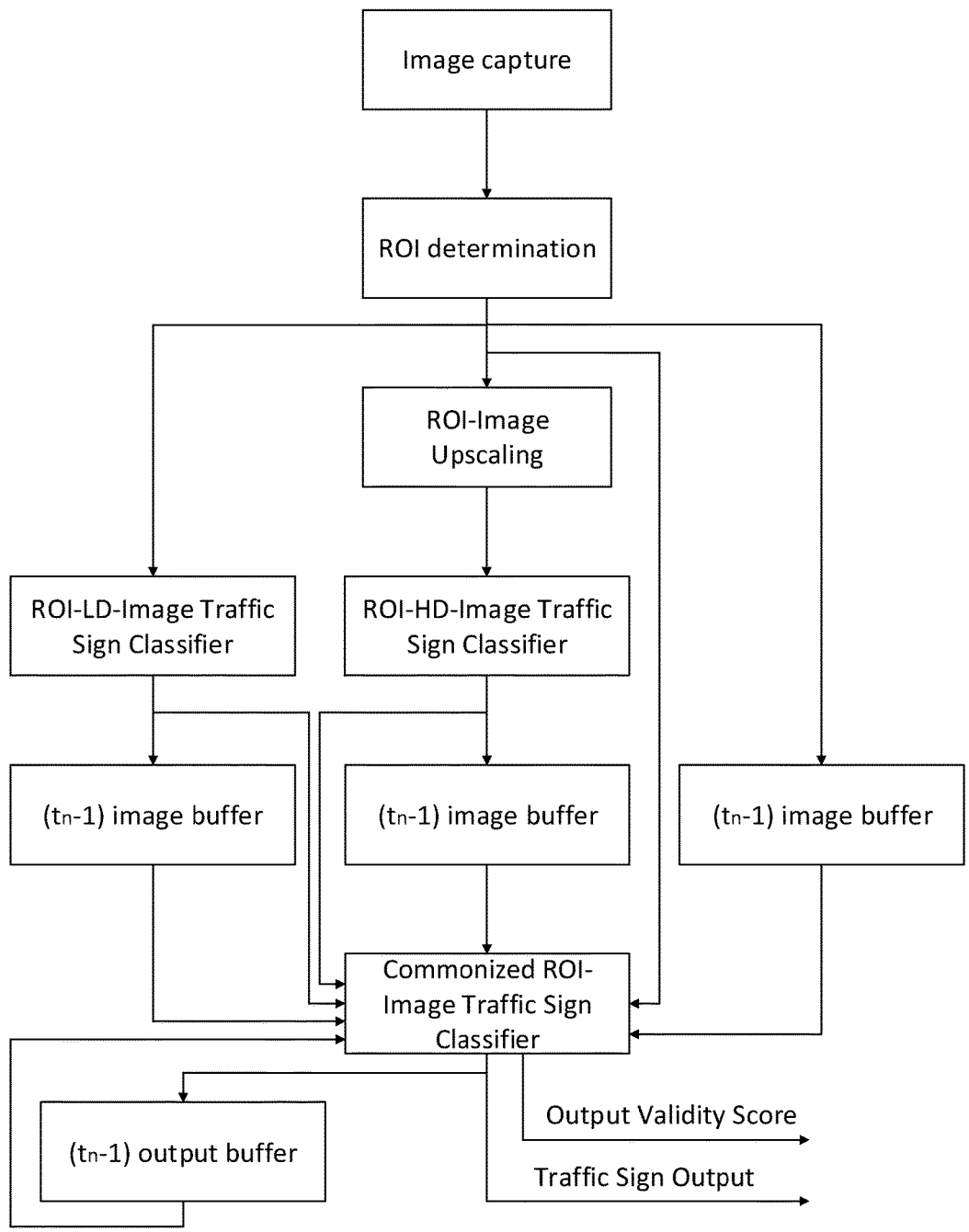
FIG. 9 is a process diagram showing traffic sign recognition using a commonized ROI-image traffic sign classifier in accordance with the present invention.

Optionally, and such as shown in FIG. 9, another algorithm may be implemented to enhance traffic sign recognition. As shown in FIG. 9, the commonized ROI-image traffic sign classifier receives (i) the captured image data (after ROI determination), (ii) an image buffer of the captured image data, (iii) an output of the ROI-LD-image traffic sign classifier, (iv) an image buffer of the output of the ROI-LD-image traffic sign classifier, (v) an output of an ROI-HD-image traffic sign classifier, and (vi) an image buffer of the output of the ROI-HD-image traffic sign classifier, and may also receive an output buffer of its traffic sign output. Based on the received inputs, the commonized ROI-image traffic sign classifier determines and generates a traffic sign output and an output validity score.

Since the host vehicle, which has a front camera which captures image data that is processed for TSR, is typically approaching toward stationary traffic signs, the detection tasks gets easier as the vehicle approaches the sign since the sign comes consecutively closer (over consecutive camera images) and by that is appearing larger and larger, covering more and more camera pixels, which makes a true detection more likely. Some circumstances such as occlusions, stray light or rain may appear that diminish the positive detection rate. Since the TSR is running all the time (when the vehicle is being driven by a driver or by an autonomous or semi-autonomous control), the results of the past are present. These may be buffered. The buffer may hold one or a plurality of output result values.

Figure 10:
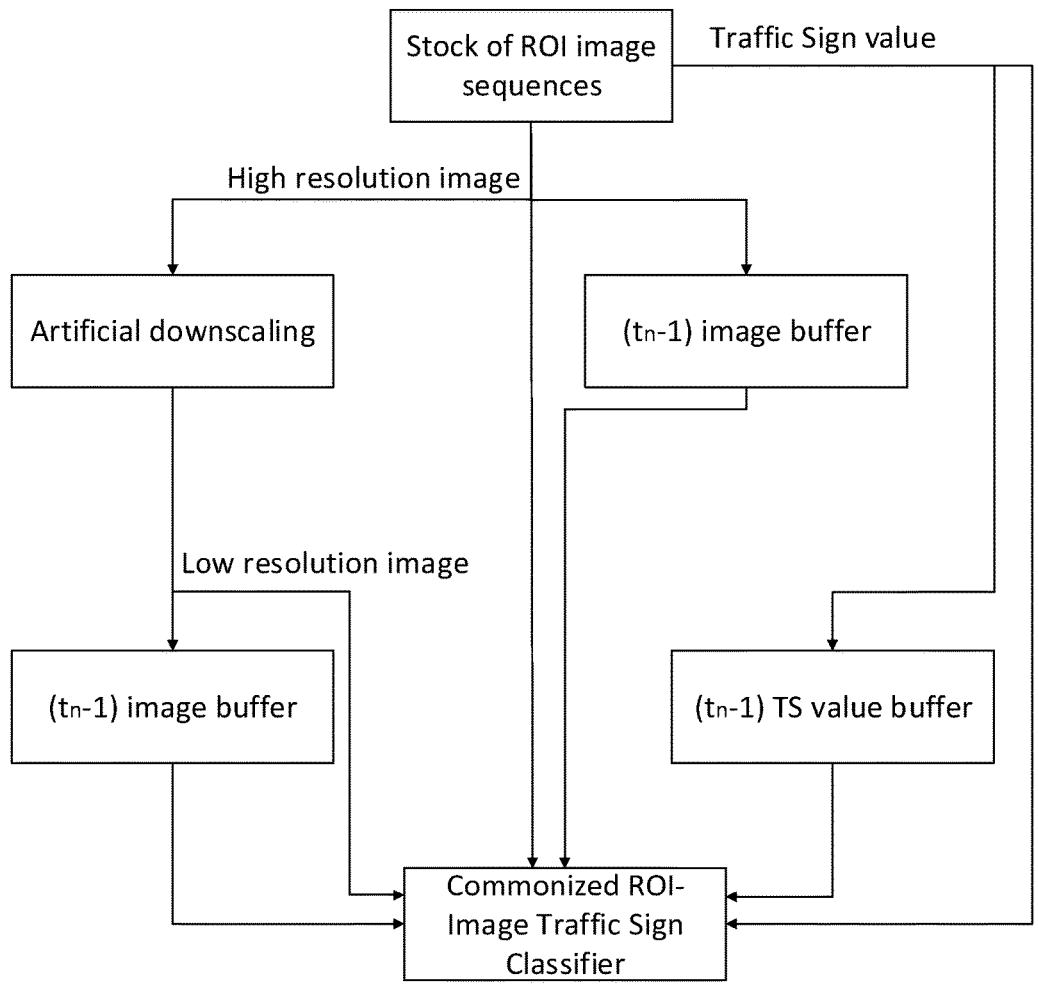
FIG. 10 is a process diagram showing training of the commonized ROI-image traffic sign classifier based on stock images in accordance with the present invention.

Optionally, the output traffic sign may be altered after the commonized ROI Image Traffic Sign Classifier has recognized the to-be-altered sign value more than one time. Optionally, the output value may come with an output validity score, which diminishes when the commonized ROI Image Traffic Sign Classifier's results are discontinuous. In this option, the traffic sign output may be always the last result. The commonized ROI Image Traffic Sign Classifier may work even better when the past pre-classifier's output and source images are also fed in together with the present pre-classifier's output and source images, such as is also shown in FIG. 9. The training of that commonized ROI Image Traffic Sign Classifier may be done with sequences of images showing with traffic signs and its values (such as shown in FIG. 10). Optionally, all of the classifiers may be of the type k-means or support vector machine.

Thus, the present invention provides a traffic sign recognition feature that is trained to recognize traffic signs in low resolution images captured by the forward viewing camera. The system is trained by comparing low resolution image data to a stock of images, when knowing the actual traffic sign value. When so trained, the system is operable to compare low resolution captured image data to upscaled images (that comprise the captured image data upscaled based on known traffic signs and a putatively detected traffic sign) to determine or classify or recognize the traffic sign present in the field of view of the low resolution camera.

The system thus may, via processing of image data captured by the camera, putatively detect presence of a traffic sign (such as be detecting an object that may generally correspond to a traffic sign shape and that may be at a region of interest where a traffic sign may be expected), and may upscale or enhance or increase the resolution of the image data responsive to known traffic signs. The upscaled or enhanced image data is then processed and compared to the captured image data to determine and/or classify the putatively detected traffic sign. The upscaling may be derived from a database of known traffic signs that may be accessed by the control (where the control may select a known traffic sign from the database) or may be derived from training of the vision system via comparisons of captured image data that represents particular traffic signs with stored image data of known traffic signs to determine correlations and similarities so as to enhance determination and/or classification of traffic signs in image data captured by the camera as the vehicle travels along a road.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0373345; US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing the forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
a camera disposed at a vehicle and having a field of view exterior of the vehicle, said camera capturing image data;
a control disposed at the vehicle, wherein said control comprises an image processor operable to process image data captured by said camera;
wherein said control, responsive at least in part to putative detection of a traffic sign via image processing by said image processor of image data captured by said camera, enhances resolution of captured image data based at least in part on known traffic sign images to generate upscaled image data; and wherein said control compares captured image data to upscaled image data to determine the putatively detected traffic sign.

2. The vision system of claim 1, wherein said control compares captured image data to upscaled image data to classify the determined traffic sign.

3. The vision system of claim 1, wherein said control learns known traffic signs via processing of the stored image data of known traffic signs.

4. The vision system of claim 1, wherein said control classifies the putatively detected traffic sign based at least in part on an output of a low resolution classifier that processes image data captured by said camera.

5. The vision system of claim 1, wherein said control classifies the putatively detected traffic sign based at least in part on an output of a high resolution classifier that processes the upscaled image data.

6. The vision system of claim 1, wherein said control classifies the detected traffic sign at least in part via a comparison of an output of a low resolution classifier that processes image data captured by said camera with an output of a high resolution classifier that processes the upscaled image data.

7. The vision system of claim 1, wherein said control comprises memory that stores known traffic sign images, and wherein said control enhances resolution of captured image data based at least in part on a selected one of the stored known traffic sign images to generate the upscaled image data.

8. The vision system of claim 7, wherein said memory stores a database of high resolution known traffic sign images.

9. The vision system of claim 7, wherein said control, responsive at least in part to putative detection of a traffic sign via image processing by said image processor of image data captured by said camera, selects the selected one of the stored known traffic sign images.

10. The vision system of claim 1, wherein said control receives (i) an output of an low resolution image traffic sign classifier that classifies the putatively detected traffic sign based on processing of captured image data, and (ii) an output of a high resolution image traffic sign classifier that classifies the putatively detected traffic sign based on processing of the upscaled image data.

11. The vision system of claim 10, wherein said control compares the output of the low resolution image traffic sign classifier to the output of the high resolution image traffic sign classifier to classify the determined traffic sign.

12. The vision system of claim 11, wherein said control compares the captured image data to the output of the low resolution image traffic sign classifier and to the output of the high resolution image traffic sign classifier to classify the determined traffic sign.

13. A vision system for a vehicle, said vision system comprising:

a camera disposed at a vehicle and having a field of view exterior and forward of the vehicle, said camera capturing image data;

a control disposed at the vehicle, wherein said control comprises an image processor operable to process image data captured by said camera;

wherein said control, responsive at least in part to putative detection of a traffic sign via image processing by said image processor of a region of interest of image data captured by said camera where a traffic sign may be present, enhances resolution of captured image data based at least in part on known traffic sign images to generate upscaled image data;

wherein said control receives an output of a low resolution classifier that processes image data captured by said camera and receives an output of a high resolution classifier that processes the upscaled image data; and wherein said control compares the output of said low resolution classifier to the output of said high resolution classifier to determine the putatively detected traffic sign.

14. The vision system of claim 13, wherein said control compares the output of said low resolution classifier to the output of said high resolution classifier to classify the determined traffic sign.

15. The vision system of claim 13, wherein said control compares the captured image data to the output of the low resolution image traffic sign classifier and to the output of the high resolution image traffic sign classifier to classify the determined traffic sign.

16. A vision system for a vehicle, said vision system comprising:

a camera disposed at a vehicle and having a field of view exterior and forward of the vehicle, said camera capturing image data;

a control disposed at the vehicle, wherein said control comprises an image processor operable to process image data captured by said camera;

wherein said control putatively detects a traffic sign via image processing by said image processor of image data captured by said camera, a low resolution image traffic sign classifier that processes image data to provide a low resolution classification of the putatively detected traffic sign;

wherein said control, responsive at least in part to the putative detection of the traffic sign, enhances resolution of captured image data based at least in part on known traffic sign images to generate upscaled image data;

a high resolution image traffic sign classifier that processes the upscaled image data to provide a high resolution classification of the putatively detected traffic sign; and wherein, responsive to processing by said control of (i) captured image data, (ii) the low resolution classification provided by the low resolution image traffic sign classifier, (iii) the high resolution classification provided by the high resolution image traffic sign classifier, said control classifies the putatively detected traffic sign.

17. The vision system of claim 16, wherein, said control determines an output validity score based at least in part on processing of (i) captured image data, (ii) the low resolution classification provided by the low resolution image traffic sign classifier, (iii) the high resolution classification provided by the high resolution image traffic sign classifier.

18. The vision system of claim 16, wherein said control compares the captured image data to the low resolution classification and to the output of the high resolution classification to classify the determined traffic sign to classify the putatively detected traffic sign.

19. The vision system of claim 16, wherein said control receives and processes an image buffer of the captured image data, an image buffer of an output of the low resolution image traffic sign classifier, and an image buffer of an output of the high resolution image traffic sign classifier to classify the putatively detected traffic sign.

20. The vision system of claim 19, wherein, said control determines an output validity score based at least in part on the received inputs.

\* \* \* \* \*